(12) United States Patent
Shibata

(10) Patent No.: US 10,966,272 B2
(45) Date of Patent: Mar. 30, 2021

(54) WIRELESS LAN CONNECTION DEVICE AND NON-TRANSITORY COMPUTER READABLE MEDIUM STORING PROGRAM

(71) Applicant: FUJI XEROX CO., LTD., Tokyo (JP)

(72) Inventor: Tomoya Shibata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/520,337

(22) Filed: Jul. 23, 2019

(65) Prior Publication Data

US 2020/0305214 A1   Sep. 24, 2020

(30) Foreign Application Priority Data

Mar. 20, 2019   (JP) .............................. JP2019-053822

(51) Int. Cl.
*H04W 76/18* (2018.01)
*H04W 76/11* (2018.01)
*H04W 76/23* (2018.01)
H04W 84/12 (2009.01)

(52) U.S. Cl.
CPC ............ *H04W 76/18* (2018.02); *H04W 76/11* (2018.02); *H04W 76/23* (2018.02); *H04W 84/12* (2013.01)

(58) Field of Classification Search
CPC ..... H04W 76/18; H04W 76/23; H04W 76/11; H04W 76/10; H04W 76/20
See application file for complete search history.

(56) References Cited

U.S. PATENT DOCUMENTS

| 2017/0215215 A1* | 7/2017 | Tabuki | ................ H04W 76/14 |
| 2018/0115892 A1* | 4/2018 | Kotay | ................ H04W 12/04 |
| 2018/0220475 A1* | 8/2018 | Tsurumi | ............ H04N 1/32641 |
| 2018/0273475 A1* | 9/2018 | Averick | ............... C07D 401/10 |

FOREIGN PATENT DOCUMENTS

JP   2016111495   6/2016

* cited by examiner

*Primary Examiner* — Candal Elpenord
(74) *Attorney, Agent, or Firm* — JCIPRNET

(57) ABSTRACT

A wireless LAN connection device includes a transmission unit that transmits connection information for a wireless LAN connection to a terminal in response to an information transmission request from the terminal; a connection unit that establishes the wireless LAN connection with the terminal in response to a wireless LAN connection request from the terminal using the connection information; and a change unit that changes valid connection information for which connection by the connection unit is recognized, in which the transmission unit transmits, to the terminal, the connection information that is currently valid connection information changed by the change unit and that is different from connection information that is valid in a previous wireless LAN connection.

5 Claims, 8 Drawing Sheets

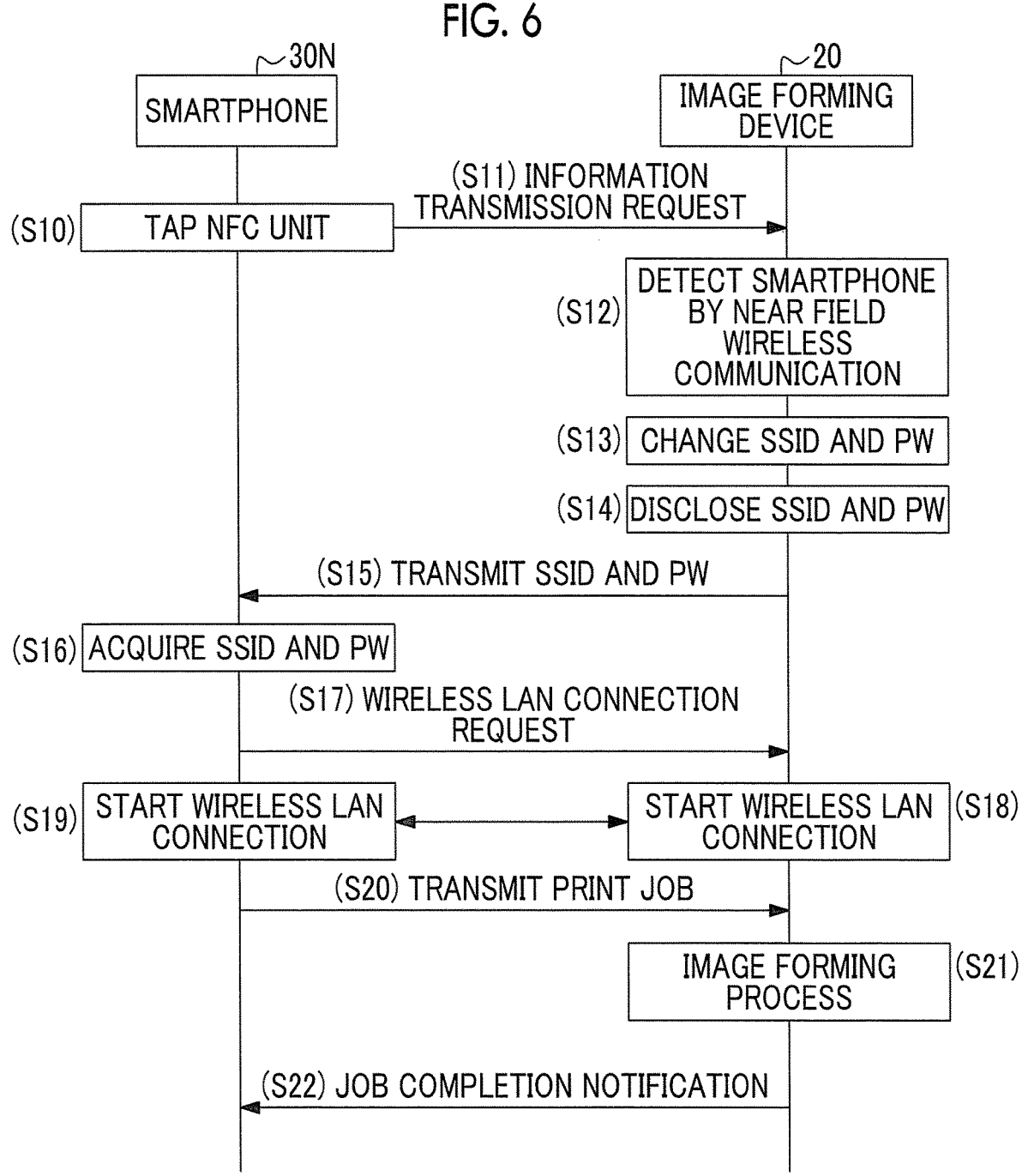

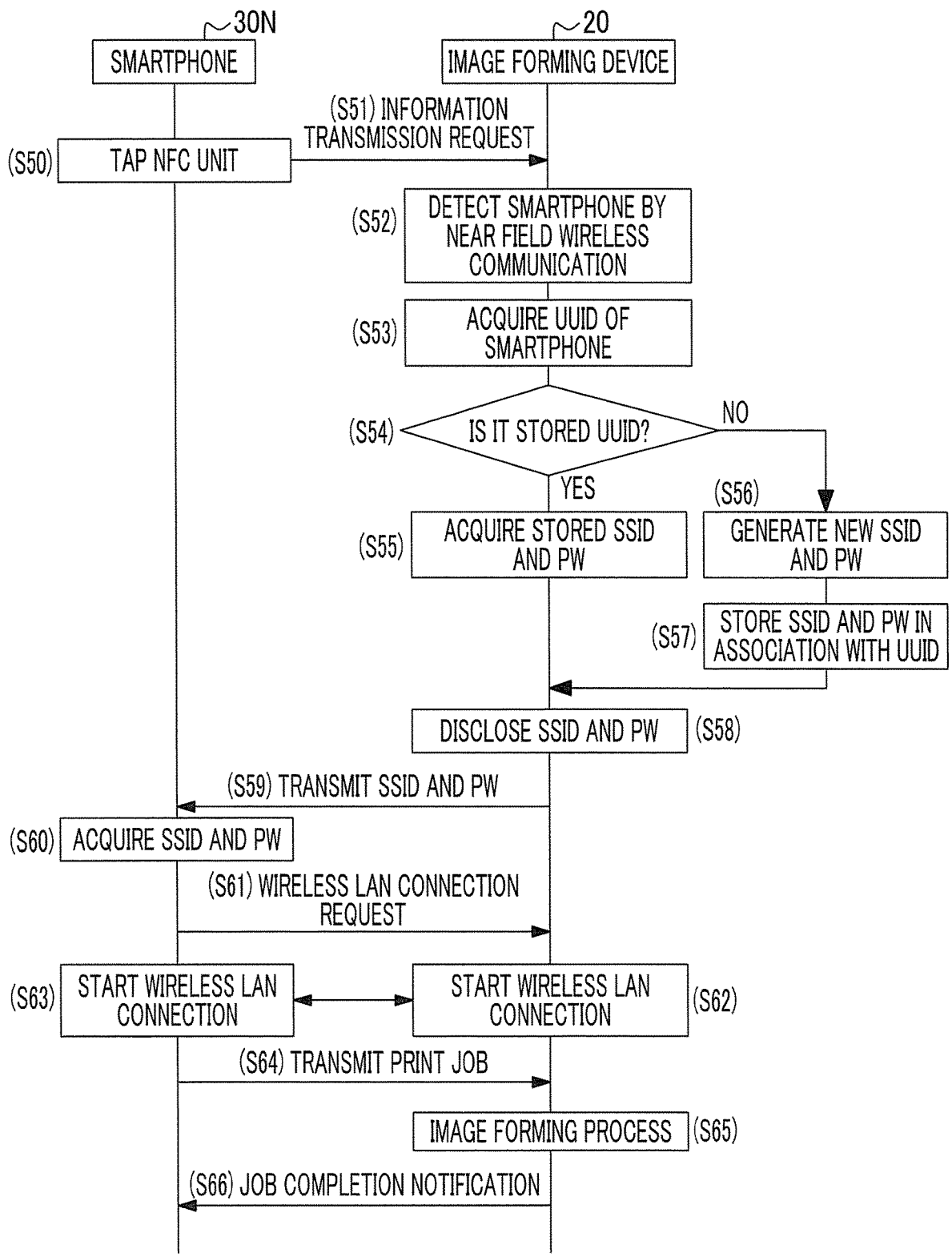

WIRELESS LAN CONNECTION DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-053822 filed Mar. 20, 2019.

BACKGROUND

(i) Technical Field

The present invention relates to a wireless LAN connection device and a non-transitory computer readable medium storing a program.

(ii) Related Art

JP2016-111495A discloses a terminal device including a control unit that controls wireless communication with a device, a first wireless communication unit that is capable of executing wireless communication with a communication destination via a relay device, a second wireless communication unit that is capable of directly executing wireless communication with a communication destination without the relay device, and a near field wireless communication unit that acquires device identification information, which is identification information of the device, from the device by near field wireless communication with the device. The control unit executes a search of the device via the relay device based on the device identification information and executes wireless communication with the device by the first wireless communication unit or the second wireless communication unit according to a result of the search in a case where the device identification information is acquired by the near field wireless communication in a state where the first wireless communication unit is connected to the relay device.

SUMMARY

There may be an upper limit on the number of terminal devices that can be connected to a device such as an image forming device by wireless LAN. In addition, in a case where the wireless LAN connection is established once, the connection is maintained without disconnection even when the use of the device is finished, or the connection information stored in the terminal device after disconnection causes the user to unintentionally be reconnected. Then, a terminal that is to newly establish a wireless LAN connection cannot make a wireless connection to a device that has already established a wireless LAN connection up to the upper limit.

Aspects of non-limiting embodiments of the present disclosure relate to a wireless LAN connection device that is capable of establishing a wireless LAN connection with a terminal in a case where there is a request from the terminal even in a case where the number of terminals capable of the wireless LAN connection has an upper limit, and a non-transitory computer readable medium storing program.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a wireless LAN connection device including: a transmission unit that transmits connection information for a wireless LAN connection to a terminal in response to an information transmission request from the terminal; a connection unit that establishes the wireless LAN connection with the terminal in response to a wireless LAN connection request from the terminal using the connection information; and a change unit that changes valid connection information for which connection by the connection unit is recognized, in which the transmission unit transmits, to the terminal, the connection information that is currently valid connection information changed by the change unit and that is different from connection information that is valid in a previous wireless LAN connection.

BRIEF DESCRIPTION OF THE DRAWINGS

Exemplary embodiments of the present invention will be described in detail based on the following figures, wherein:

FIGS. 1A and 1B are views showing a schematic configuration of an image processing system according to a first embodiment, in which FIG. 1A is a view showing a state in which one smartphone is connected to a wireless LAN, and FIG. 1B is a view showing a state in which a wireless LAN connection with a new smartphone is established;

FIG. 6 is a sequence diagram showing a flow of a communication process in the first embodiment;

FIGS. 7A and 7B are diagrams showing a schematic configuration of an image processing system according to a second embodiment, in which FIG. 7A is a diagram showing a state in which three smartphones are connected by a wireless LAN, and FIG. 7B is a diagram showing a state in which a wireless LAN connection with a new smartphone is established;

FIG. 10 is a sequence diagram showing a flow of a communication process in the third embodiment.

DETAILED DESCRIPTION

Hereinafter, in each embodiment, an image processing system to which a wireless LAN connection device of the present invention is applied will be described with reference to the drawings.

First Embodiment

Image Processing System

Figure 1A:
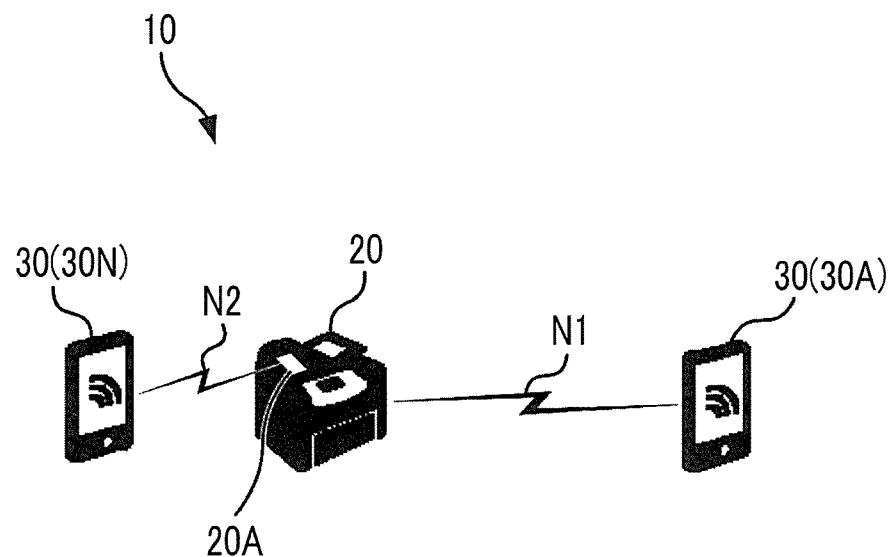

As shown in FIG. 1A, an image processing system 10 according to a first embodiment is configured to include an image forming device 20 and a plurality of smartphones 30. Here, the image forming device 20 is an example of a wireless LAN connection device, and the smartphone 30 is an example of a terminal.

The image forming device 20 and each smartphone 30 enable a wireless LAN connection by Wi-Fi (registered trademark). The image forming device 20 according to the present embodiment corresponds to Wi-Fi Direct (registered trademark). That is, each smartphone 30 is directly connected by using the image forming device 20 as an access point without passing through a router. A network N1 indicates the wireless LAN connection by the Wi-Fi Direct.

In addition, the image forming device 20 and each smartphone 30 can be connected by near field wireless communication (NFC). When the smartphone 30 approaches an NFC unit 20A provided on an upper surface of the image forming device 20, the near field wireless communication is established with an NFC I/F 24 described later. A network N2 indicates a connection by the near field wireless communication.

Figure 1B:
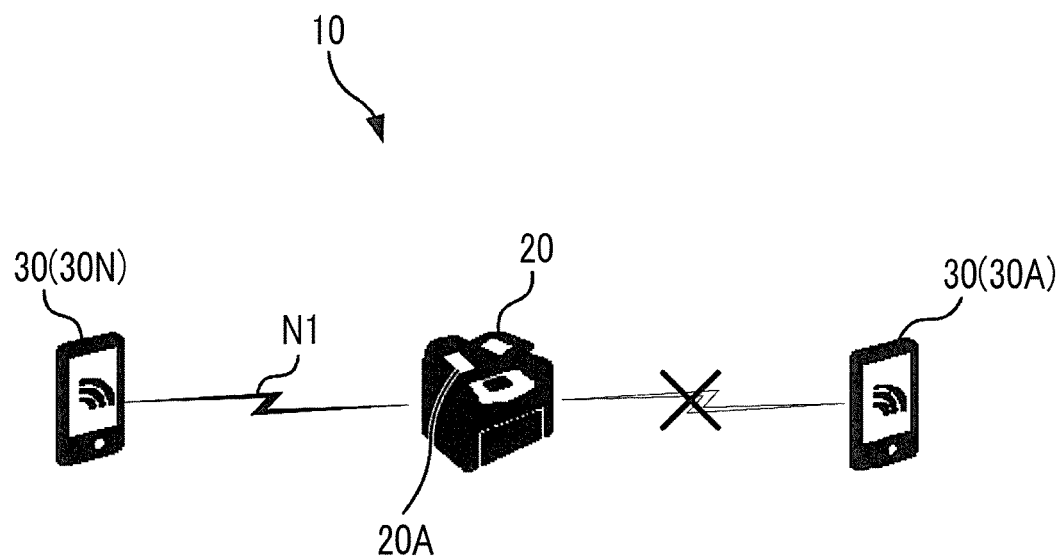

As shown in FIG. 1A, in the present embodiment, one smartphone 30 (30A) is already connected to the image forming device 20 via the network N1. Here, the number of connectable terminals is set in advance in the network N1, but as shown in FIGS. 1A and 1B, in the case of the present embodiment, one smartphone 30 (30A or 30N) is always connected to the network N1.

Image Forming Device

The image forming device 20 is a device that forms an image on a recording medium such as a sheet based on a print job from each smartphone 30.

Figure 2:
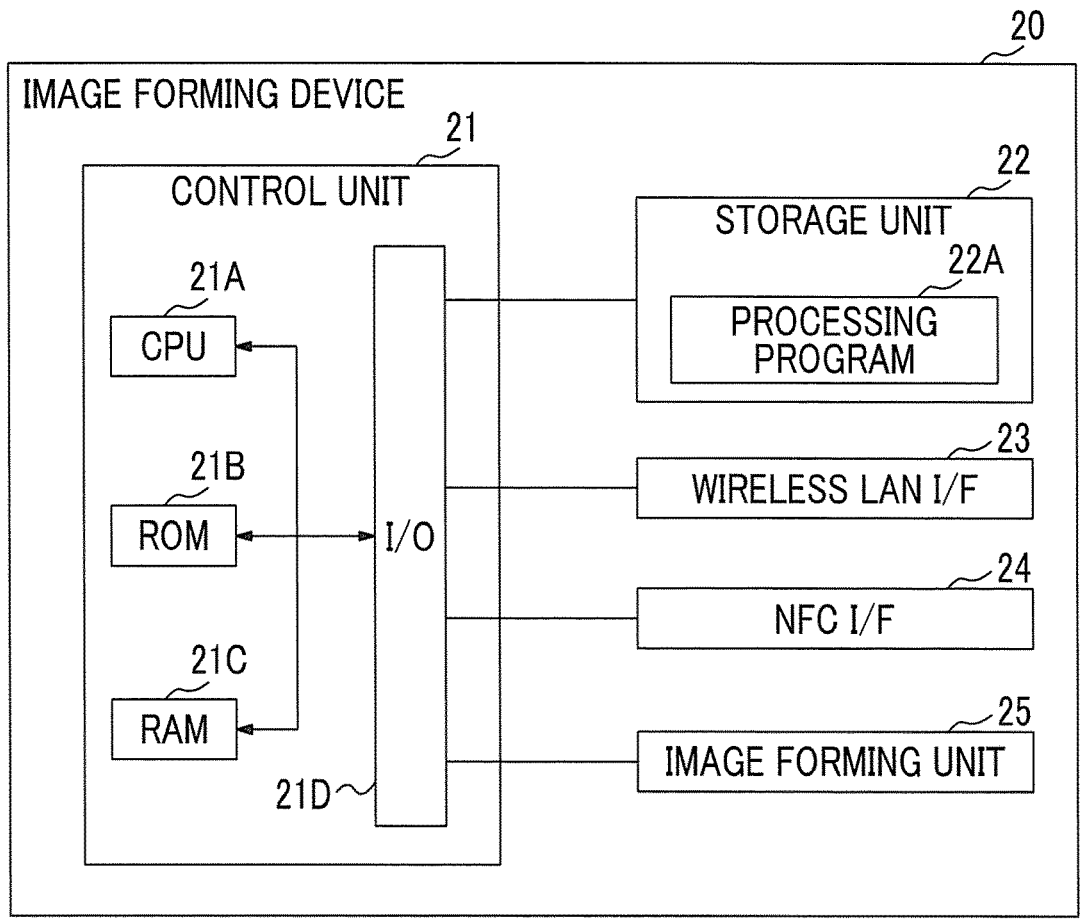
FIG. 2 is a block diagram showing a hardware configuration of the image forming device according to the first embodiment.

FIG. 2 is a block diagram showing an example of a hardware configuration of the image forming device 20 according to the present embodiment.

As shown in FIG. 2, the image forming device 20 according to the present embodiment includes a control unit 21, a storage unit 22, a wireless LAN I/F 23, the NFC I/F 24, and an image forming unit 25.

The control unit 21 includes a central processing unit (CPU) 21A, a read only memory (ROM) 21B, a random access memory (RAM) 21C, and an input/output interface (I/O) 21D, and these units are connected to one another via a bus.

Respective functional units including the storage unit 22, the wireless LAN I/F 23, the NFC I/F 24, and the image forming unit 25 are connected to the I/O 21D. Each of these functional units can mutually communicate with the CPU 21A via the I/O 21D.

The control unit 21 may be configured as a sub control unit that controls a part of an operation of the image forming device 20 or may be configured as a part of a main control unit that controls an overall operation of the image forming device 20.

As the storage unit 22, for example, a solid state drive (SSD), a flash memory, or the like is used. The storage unit stores a processing program 22A for executing a communication process according to the present embodiment. The processing program 22A may be stored in the ROM 21B.

The wireless LAN I/F 23 has a function of performing wireless communication with the smartphone 30 by the Wi-Fi Direct. The wireless LAN I/F 23 includes an antenna for wireless communication, and functions as a communication interface that transmits and receives various data to and from the smartphone 30.

The NFC I/F 24 has a function of performing wireless communication with the smartphone 30 by the near field wireless communication. The NFC I/F 24 includes an antenna for wireless communication, and functions as a communication interface that transmits and receives various data to and from the smartphone 30.

The image forming unit 25 forms an image on a recording medium such as paper based on image information acquired from the smartphone 30 or image information obtained by reading by a document reading unit (not shown). As a method of forming an image, an electrophotographic method, an ink-jet method, or the like is adopted.

Figure 3:
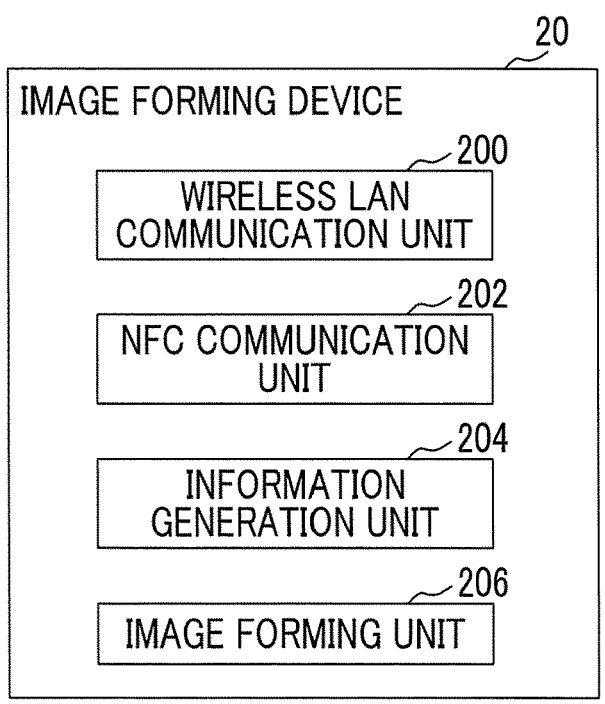
FIG. 3 is a block diagram showing an example of a functional configuration of the image forming device according to the first embodiment.

FIG. 3 is a block diagram showing an example of a functional configuration of the image forming device 20 according to the present embodiment. The image forming device 20 according to the present embodiment functions as a wireless LAN communication unit 200, an NFC communication unit 202, an information generation unit 204, and an image forming unit 206. The image forming device 20 functions as each unit shown in FIG. 3 by reading the processing program 22A stored in the storage unit 22 and executing the processing program 22A with the RAM 21C as a work area by the CPU 21A. The wireless LAN communication unit 200 is an example of a connection unit, the NFC communication unit 202 is an example of a transmission unit, and the information generation unit 204 is an example of a change unit.

The wireless LAN communication unit 200 has a function of establishing the wireless LAN connection with the smartphone 30 and communicating with the smartphone 30. The wireless LAN communication unit 200 of the present embodiment responds to a wireless LAN connection request from the smartphone 30 using a service set identifier (SSID) and a password, and establishes the wireless LAN connection with the smartphone 30 in a case where the SSID and the password match. The SSID and the password are an example of connection information. Here, the connection information is information used to establish the wireless LAN connection.

The NFC communication unit 202 has a function of transmitting a valid SSID and password to establish the near field wireless communication with the smartphone 30, respond to an information transmission request from the smartphone 30, and at the same time, to establish the wireless LAN connection to the smartphone 30. The NFC communication unit 202 of the present embodiment receives an information transmission request from the smartphone 30 and transmits the SSID and the password to the smartphone 30 when the smartphone 30 having the NFC I/F 34 described later approaches the NFC unit 20A. In addition, in a case where the SSID and the password are changed in the information generation unit 204 described later, the NFC communication unit 202 transmits the changed SSID and the password to the smartphone 30.

The information generation unit 204 has a function of generating the SSID and the password to be disclosed to perform the wireless LAN connection by the wireless LAN communication unit 200. In addition, the information generation unit 204 has a function of changing the valid SSID and the password at a predetermined chance. The change includes both a case where the current SSID and the password stored in the ROM 21B or the RAM 21C are deleted, and a newly generated SSID and password are stored (rewrite), and a case where the newly generated SSID and the password are overwritten. The information generation unit 204 of the embodiment changes the valid SSID and the password when receiving the information transmission request from the smartphone 30N. Here, the valid SSID and the password are an SSID and a password for which the wireless LAN connection by the wireless LAN communication unit 200 is recognized (that is, usable). The SSID and the password erased or overwritten by the information generation unit 204 are no longer the valid SSID and the password because the wireless LAN connection using these is not recognized.

The image forming unit 206 has a function of executing an image forming process for forming an image on the recording medium such as a sheet based on a print job received from the smartphone 30. In addition, in a case where the image forming process based on the print job is finished, a job completion is notified to the smartphone 30.
Smartphone 30

The smartphone 30 is a portable terminal owned by a user.

Figure 4:
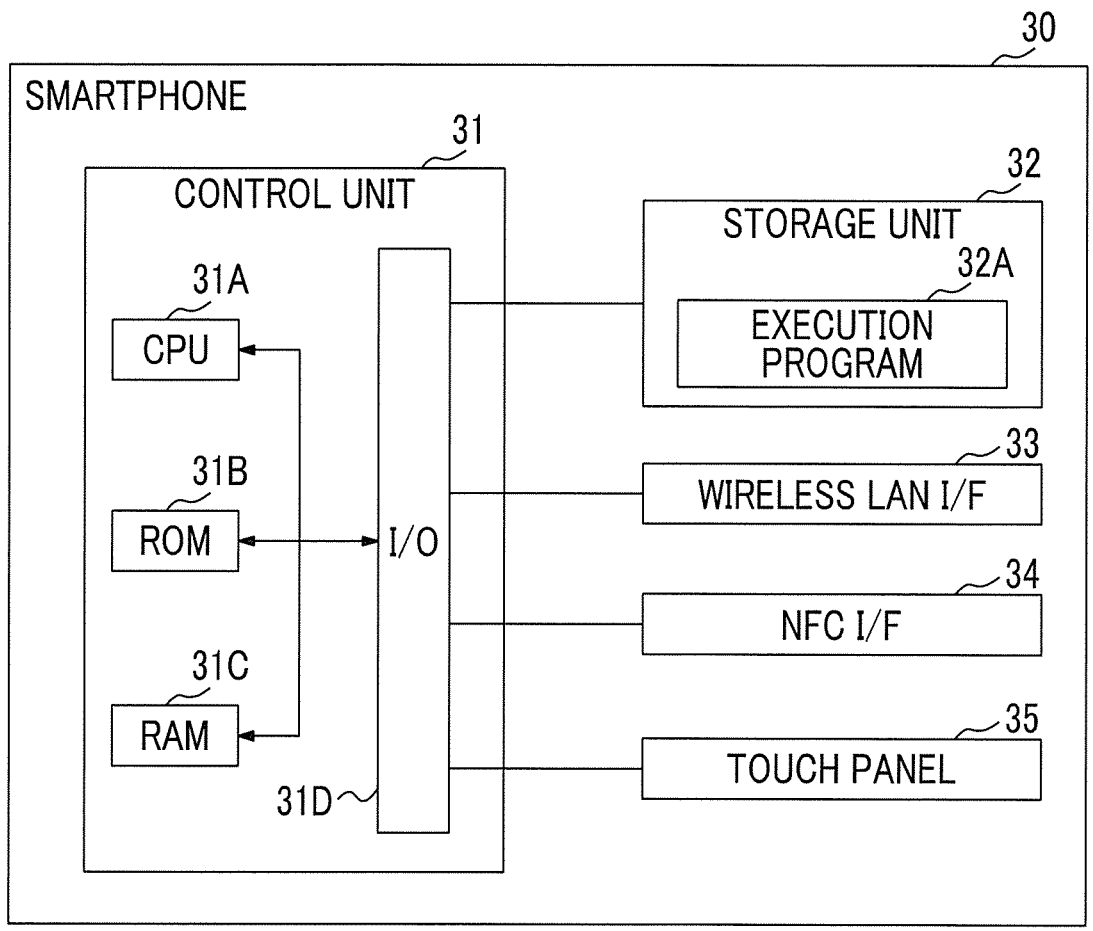
FIG. 4 is a block diagram showing a hardware configuration of the smartphone according to the first embodiment.

FIG. 4 is a block diagram showing an example of a hardware configuration of the smartphone 30 according to the present embodiment.

As shown in FIG. 4, the smartphone 30 of the present embodiment includes a control unit 31, a storage unit 32, a wireless LAN I/F 33, an NFC I/F 34, and a touch panel 35.

The control unit 31 includes a CPU 31A, a ROM 31B, a RAM 31C, and an I/O 31D, and these units are connected to one another via a bus.

Functional units including the storage unit 32, the wireless LAN I/F 33, the NFC I/F 34, and the touch panel 35 are respectively connected to the I/O 31D. These respective functional units can mutually communicate with the CPU 31A via the I/O 31D.

The control unit 31 may be configured as a sub control unit that controls a part of the operation of the smartphone 30, or may be configured as a part of a main control unit that controls the overall operation of the smartphone 30.

For example, an SSD, a flash memory, or the like is used as the storage unit 32. The storage unit 32 stores an execution program 32A for performing the communication process. The execution program 32A may be stored in the ROM 31B.

The wireless LAN I/F 33 has a function of performing the wireless communication with the image forming device 20 by the Wi-Fi Direct. The wireless LAN I/F 33 includes an antenna for the wireless communication, and functions as a communication interface that transmits and receives various data to and from the image forming device 20.

The NFC I/F 34 has a function of performing the wireless communication with the image forming device 20 by the near field wireless communication. The NFC I/F 34 includes an antenna for the wireless communication, and functions as a communication interface that transmits and receives various data to and from the image forming device 20.

The touch panel 35 is a combination of a display device such as a liquid crystal display (LCD) or an organic electro luminescence display, and a touch sensor of a resistive film method or an electrostatic capacitive method. The touch panel 35 allows the user to perform various operations by touching buttons or icons on a screen. The touch panel 35 may be separated from the operation unit and the display device.

Figure 5:
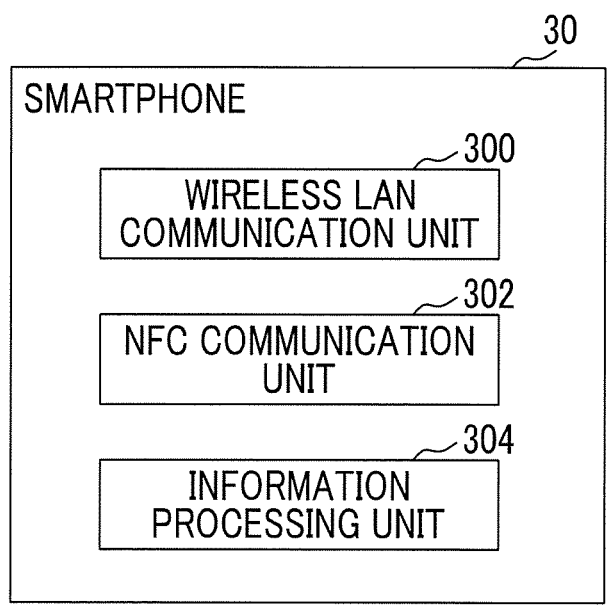
FIG. 5 is a block diagram showing an example of a functional configuration of the smartphone according to the first embodiment.

FIG. 5 is a block diagram showing an example of a functional configuration of the smartphone 30 according to the present embodiment. The smartphone 30 according to the present embodiment functions as a wireless LAN communication unit 300, an NFC communication unit 302, and an information processing unit 304. The smartphone 30 functions as each unit shown in FIG. 5 by reading the execution program 32A stored in the storage unit 32 and executing the execution program 32A with the RAM 31C as a work area by the CPU 31A.

The wireless LAN communication unit 300 has a function of performing the wireless LAN connection request using the SSID and the password acquired from the image forming device 20 and establishing the wireless LAN connection with the image forming device 20. In the present embodiment, the SSID and the password used for the wireless LAN connection are automatically acquired via the NFC communication unit 302. However, the present invention is not limited to the configuration, and may be acquired by an input operation of the user on the touch panel 35.

The NFC communication unit 302 has a function of performing the information transmission request to the image forming device 20 using identification information (for example, UUID) of the smartphone 30, and acquiring the SSID and the password from the image forming device 20.

The information processing unit 304 has a function of executing various processes in the smartphone 30. For example, the information processing unit 304 has a function of generating the print job based on an operation on the touch panel 35 by the user. Further, for example, in a case where the wireless LAN connection is established with the image forming device 20, the information processing unit 304 has a function of displaying the state thereof on the touch panel 35.
Flow of Process As shown in FIG. 1A, in a case where one smartphone 30A is connected to the image forming device 20, a case where a new smartphone 30N performs an image forming process will be described. In the image processing system 10 of the present embodiment, the following communication process is executed between the smartphone 30N and the image forming device 20.

In step S10 of FIG. 6, the smartphone 30N is tapped by the NFC unit 20A of the image forming device 20.

In step S11, in the smartphone 30N, the CPU 31A performs the information transmission request to the image forming device 20. That is, a command for requesting the SSID and the password is transmitted to the image forming device 20 together with the identification information of the smartphone 30N.

In step S12, in the image forming device 20, the CPU 21A detects the smartphone 30N by the near field wireless communication.

In step S13, in the image forming device 20, the CPU 21A changes the SSID and the password. Here, the SSID and the password to be changed are an SSID and a password that are different from the SSID and the password that are currently validated with the smartphone 30A connected to the image forming device 20.

In step S14, in the image forming device 20, the CPU 21A discloses, that is, validates the changed SSID and the password, and invalidates the previously disclosed SSID and password. Therefore, the wireless LAN connection to the smartphone 30A previously connected to the image forming device 20 is disconnected (see FIG. 1B).

In a case where the image forming process is executed in the image forming device 20 based on the print job transmitted from the smartphone 30A, the disclosure of the SSID and the password may be suspended until at least the transmission of the print job is finished.

In step S15, in the image forming device 20, the CPU 21A transmits the SSID and the password to the smartphone 30N.

In step S16, in the smartphone 30N, the CPU 31A acquires the SSID and the password.

In step S17, in the smartphone 30N, the CPU 31A performs the wireless LAN connection request. That is, connection by the Wi-Fi Direct using the SSID and the password is attempted.

In step S18, in the image forming device 20, the CPU 21A starts the wireless LAN connection based on the valid SSID and the password.

In step S19, in the smartphone 30N, the CPU 31A starts the wireless LAN connection. The wireless LAN connection is established between the image forming device 20 and the smartphone 30N by executing steps S18 and S19 (see FIG. 1B).

In step S20, in the smartphone 30N, the CPU 31A transmits the print job.

In step S21, in the image forming device 20, the CPU 21A executes the image forming process based on the print job.

In step S22, in the image forming device 20, when the image forming process is finished, the CPU 21A transmits a job completion notification to the smartphone 30N. Then, the communication process is finished.

At the stage when the image forming process in step S21 is finished, the wireless LAN connection between the image forming device 20 and the smartphone 30N is still established. Therefore, in a case where the user operates the touch panel 35 of the smartphone 30N or the like to generate a new print job, the CPU 21A executes an image forming process based on the new print job.

Outline

As in the case of the image forming device 20 of the present embodiment, an upper limit may be provided to the number of terminals that can perform the wireless LAN connection with a wireless LAN connection device. In addition, once the wireless LAN connection with the terminal is established, the wireless LAN connection is maintained without disconnection even when the use of the image forming device 20 is finished, or reconnection may be performed by the SSID and the password stored in the terminal even after the disconnection without an intention of the user. Then, a terminal that performs a new wireless LAN connection cannot connect to the image forming device 20 for which the wireless LAN connection has already been established up to the upper limit.

Therefore, in a case where the image forming device 20 according to the present embodiment receives the information transmission request from the smartphone 30N that newly performs the wireless LAN connection, the current effective SSID and the password changed by the information generation unit 204 are transmitted to the smartphone 30N. Here, the present embodiment is characterized in that the currently valid SSID and the password to be transmitted are an SSID and a password different from the SSID and the password which are valid in the previous wireless LAN connection.

Therefore, according to the image forming device 20 of the present embodiment, even in a case where there is an upper limit to the number of smartphones 30 enabling the wireless LAN connection, in a case where there is a request from a new smartphone 30N, the wireless LAN connection with the smartphone 30 is established.

Further, the image forming device 20 according to the present embodiment changes the SSID and the password in response to the information transmission request. However, the present invention is not limited to the configuration and, for example, the SSID and the password may be changed at any timing such as at the end of the previous print job. However, as in the present embodiment, the ID and the password are changed at any timing by changing the SSID and the password at the timing when the information transmission request is received from the smartphone 30N which transmits the print job. Therefore, disconnection of the wireless LAN connection during the transmission of the print job of the smartphone 30A already connected is suppressed in comparison with a case in which the ID and the password are changed at any timing.

Second Embodiment

In an image processing system 10 of a second embodiment, a flow of a communication process in an image forming device 20 is different from that of the first embodiment. Hereinafter, differences from the first embodiment will be described. The same components as those in the first embodiment are denoted by the same reference numerals, and descriptions thereof will be omitted.

Figure 7A:
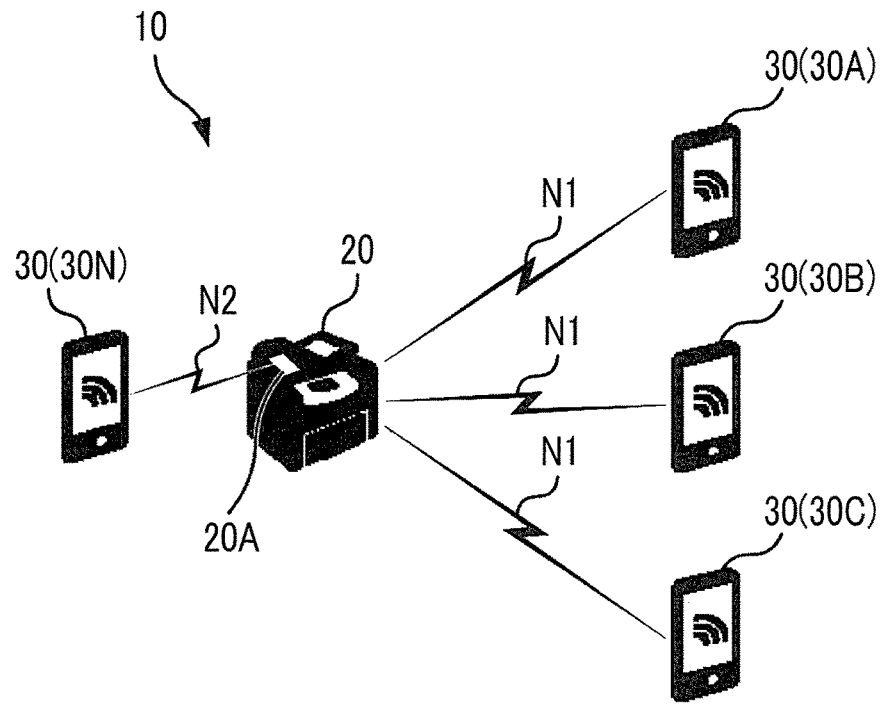

As shown in FIG. 7A, in the present embodiment, three smartphones 30 (30A to 30C) are connected to the image forming device 20 via a network N1. In the present embodiment, an upper limit of the number of terminals connectable to the network N1 is three, and three smartphones 30 are already connected to the network N1.

An information generation unit 204 of the present embodiment changes the valid SSID and the password in a case where the number of the smartphones 30 establishing the wireless LAN connection reaches the upper limit when the information transmission request is received from the smartphone 30N.

In the present embodiment, a case where a new smartphone 30N performs an image forming process will be described. In the image processing system 10 of the present embodiment, the following communication process is executed between the smartphone 30N and the image forming device 20.

Figure 8:
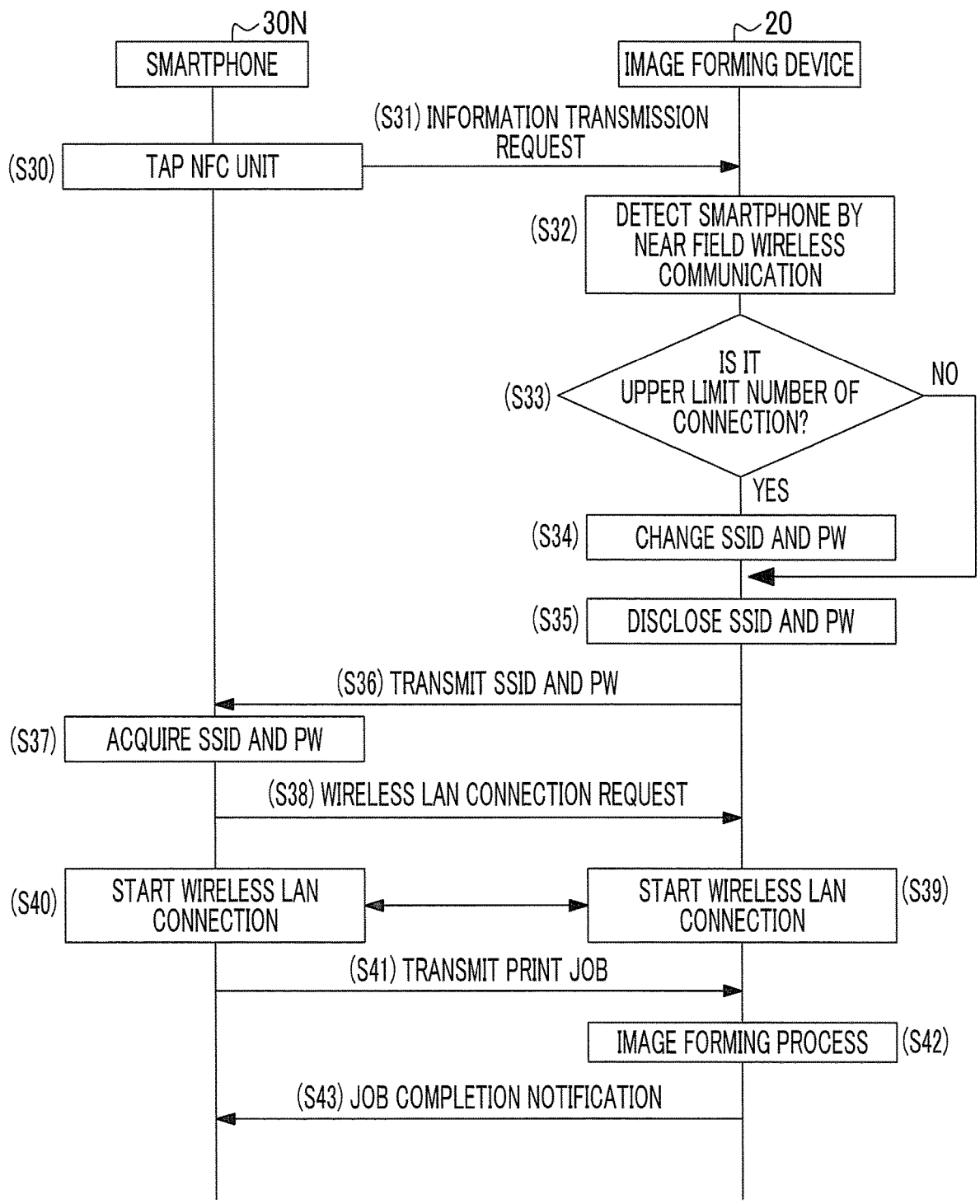
FIG. 8 is a sequence diagram showing a flow of a communication process in the second embodiment.

In processes of steps S30 to S32 of FIG. 8, the same processes as the processes of S10 to S12 of the communication process of the first embodiment are executed (see FIG. 6).

In step S33, in the image forming device 20, a CPU 21A determines whether the current number of connections of the network N1, that is, the number of terminals for which the wireless LAN connection is established, reaches the upper limit number. In a case where the CPU 21A determines that the current number of connections reaches the upper limit, the process proceeds to step S34. On the other hand, in a case where the CPU 21A determines that the current number of connections does not reach the upper limit, the process proceeds to step S35.

Figure 7B:
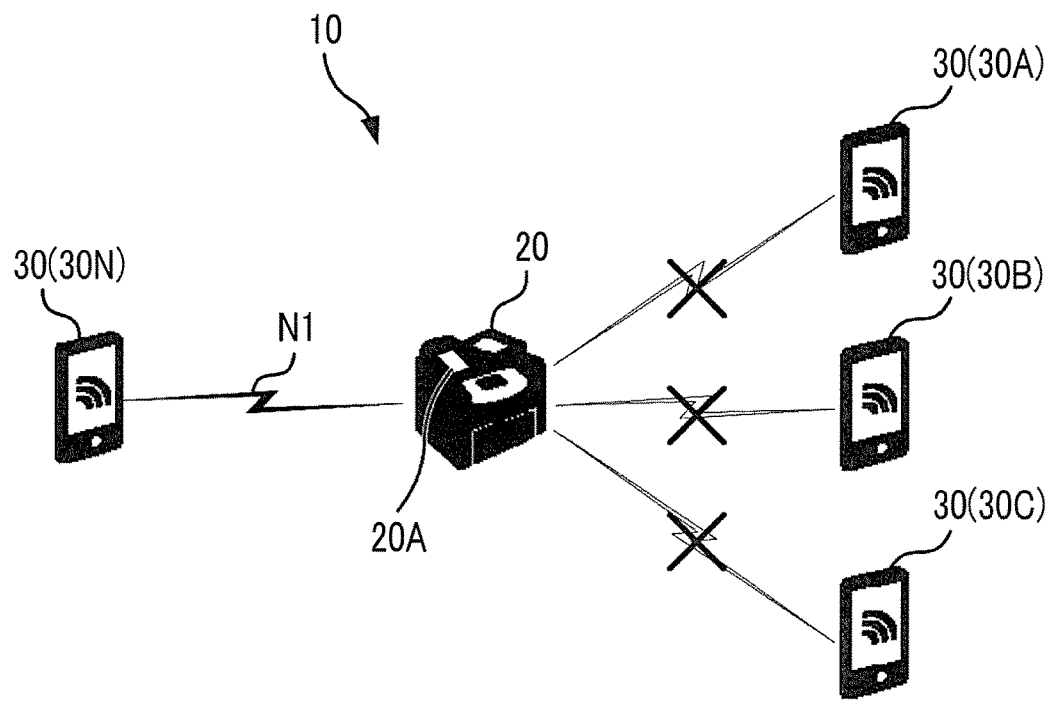

In step S34, in the image forming device 20, the CPU 21A changes the SSID and the password. Here, the SSID and the password to be changed are an SSID and a password that are different from the SSID and the password that are currently validated with the smartphone 30A connected to the image forming device 20. Thus, the wireless LAN connection with the smartphones 30A to 30C previously connected to the image forming device 20 is disconnected (see FIG. 7B).

In processes of steps S35 to S43, the same processes as the processes of S14 to S22 of the communication process of the first embodiment are executed (see FIG. 6). The wireless LAN connection is established between the image forming device 20 and the smartphone 30N by executing steps S39 and S40 (see FIG. 7B). Here, in a case where a new wireless LAN connection is established with the smartphone 30N by the changed SSID and the password, the wireless LAN connection can be established with two more smartphones 30 until the upper limit of the number of connections is reached. The communication process is finished by completion of step S43.

Third Embodiment

In an image processing system 10 of a third embodiment, a flow of a communication process in an image forming device 20 is different from those of the first and second embodiments. Hereinafter, differences from the first embodiment will be described. The same components as those in the first embodiment are denoted by the same reference numerals, and descriptions thereof will be omitted.

As shown in FIGS. 1A and 1B, in the present embodiment, one smartphone 30 (30A or 30N) is connected to the network N1.

Figure 9:
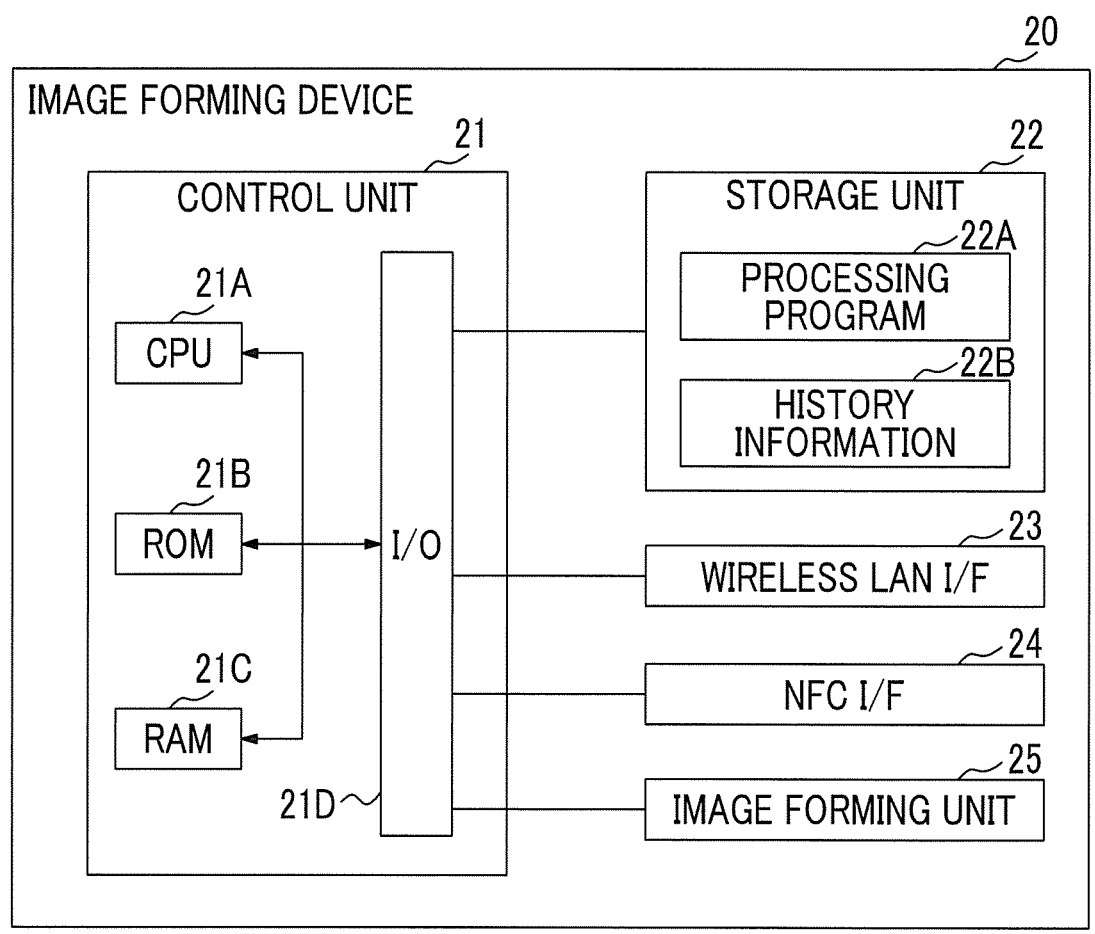
FIG. 9 is a block diagram showing a hardware configuration of an image forming device according to a third embodiment.

As shown in FIG. 9, in the image forming device 20 according to the present embodiment, history information 22B is stored in a storage unit 22 in addition to a processing program 22A. The history information 22B may be stored in a ROM 21B.

The history information 22B includes an SSID and a password used in the past for wireless LAN connection. The history information 22B also includes a universally unique identifier (UUID) unique to a smartphone 30 in which the wireless LAN connection is established. The UUID is an example of identification information. The history information 22B of the present embodiment stores the UUID, the SSID, and the password in association with each other in a case where the wireless LAN connection is established in the smartphone 30 with the UUID.

When an information generation unit 204 of the present embodiment receives an information transmission request from the smartphone 30N, the information generation unit 204 changes the SSID and the password included in the history information 22B to the valid SSID and the password. In particular, in a case where there is the SSID and the password corresponding to the UUID of the smartphone 30N transmitting a current information transmission request, the information generation unit 204 changes the SSID and the password to the valid SSID and the password based on the history information 22B. Further, based on the history information 22B, in a case where there is no SSID and password corresponding to the UUID of the smartphone 30N that has received the current information transmission request, the information generation unit 204 newly generates the SSID and the password not included in the history information 22B.

In the present embodiment, a case where a new smartphone 30N performs an image forming process will be described. In the image processing system 10 of the present embodiment, the following communication process is executed between the smartphone 30N and the image forming device 20.

In processes of steps S50 to S52 of FIG. 10, the same processes as the processes of S10 to S12 of the communication process of the first embodiment are executed (see FIG. 6).

In step S53, in the image forming device 20, the CPU 21A acquires the UUID of the smartphone 30N by the near field wireless communication.

In step S54, in the image forming device 20, the CPU 21A refers to the history information 22B and determines whether the acquired UUID is the UUID stored in the storage unit 22 or not. In a case where the CPU 21A determines that the acquired UUID is the UUID stored in the storage unit 22, the process proceeds to step S55. On the other hand, in a case where the CPU 21A determines that the acquired UUID is not the UUID stored in the storage unit 22, the process proceeds to step S56.

In step S55, in the image forming device 20, the CPU 21A acquires the stored SSID and the password from the storage unit 22. Specifically, in the history information 22B, the SSID corresponding to the acquired UUID and the password are read.

In step S56, in the image forming device 20, the CPU 21A generates a new SSID and password. Here, the generated SSID and the password are the SSID and the password not stored in the history information 22B, that is, not used in the wireless LAN connection in the past. Thus, the wireless LAN connection with the smartphone 30A previously connected to the image forming device 20 is disconnected (see FIG. 1B).

In step S57, in the image forming device 20, a new SSID and password are stored in the history information 22B in association with the UUID acquired by the CPU 21A. Therefore, in a case where the smartphone 30N performs the wireless LAN connection with the image forming device 20 from next time onward, the stored SSID and the password are used.

In processes of steps S58 to S66, the same processes as the processes of S14 to S22 of the communication process of the first embodiment are executed (see FIG. 6). The wireless LAN connection is established between the image forming device 20 and the smartphone 30N by executing steps S62 and S63, (see FIG. 1B). The communication process is finished by completion of step S66.

Notes

Although the image forming device 20 is shown as the wireless LAN connection device in each of the above embodiments, the present invention is not limited to the configuration and the wireless LAN connection device includes a personal computer, a network television, a video recorder, or the like. In each of the above embodiments, the smartphone 30 is shown as the terminal connected to the image forming device 20. However, the present invention is not limited to the configuration. The terminal connectable to the image forming device 20 includes a tablet terminal, a wearable terminal, or a portable terminal such as a digital camera.

In the image forming device 20 according to each of the above embodiments, both the SSID and the password are changed in the information generation unit 204. However, the present invention is not limited to the configuration, either one of the SSID and the password may be changed.

In the image forming device 20 according to the first and second embodiments, the access point function in the wireless LAN communication unit 200 is always enabled, but the present invention is not limited to the configuration. For example, the access point function can be enabled at the timing when the smartphone 30N is detected in step S12 in FIG. 6, and the access point function can be disabled at the timing when the job completion notification in step S22 is finished. For example, the access point function can be enabled at the timing when the smartphone 30N is detected in step S32 in FIG. 8 and the access point function can be disabled at the timing when the job completion notification is finished in step S43. As described above, the power consumption of the image forming device 20 is reduced by enabling the access point function only in a case of performing the image forming process. On the other hand, in a case where the access point function is always enabled as in the present embodiment, the time until the wireless LAN connection of the smartphone 30 is established is shortened.

Each of the above embodiments may be in a form of a program causing a computer to execute the function of each unit provided in each of the image forming devices 20. Each program in the embodiments may be stored in a non-transitory storage medium such as a computer readable CD-ROM, a DVD-ROM, a USB memory, or may be received from an external server.

In each of the above embodiments, the case where the process according to the embodiments is realized by the software configuration using a computer by executing the program is described, but the present invention is not limited thereto. Each of the above embodiments may be realized by, for example, a hardware configuration or a combination of the hardware configuration and the software configuration.

Further, the flow of the process described in each of the above embodiments is also an example, and unnecessary steps may be deleted, new steps may be added, or the processing order may be changed without departing from the scope of the invention.

The present invention is not limited to the above embodiments, and various modifications and applications are possible without departing from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A wireless LAN connection device comprising:
  a processor, configured to execute:
    a transmission unit that transmits connection information for a wireless LAN connection to a terminal in response to an information transmission request from the terminal;
    a connection unit that establishes the wireless LAN connection with the terminal in response to a wireless LAN connection request from the terminal using the connection information; and
    a change unit that changes valid connection information for which connection by the connection unit is recognized; and
  a storage unit that stores the connection information used in the past for the wireless LAN connection, wherein
    the transmission unit transmits, to the terminal, the connection information that is currently valid connection information changed by the change unit and that is different from connection information that is valid in a previous wireless LAN connection,
    the change unit changes the connection information stored in the storage unit to valid connection information,
    the storage unit further stores a history in which identification information of the terminal is associated with the connection information in a case where the terminal establishes the wireless LAN connection by the connection unit, and
    the change unit changes the connection information to valid connection information in a case where connection information corresponding to a terminal transmitting a current information transmission request is present, based on the history stored in the storage unit.

2. The wireless LAN connection device according to claim 1,
  wherein the change unit changes valid connection information when receiving the information transmission request from the terminal.

3. The wireless LAN connection device according to claim 2,
  wherein the connection unit has an upper limit on the number of the terminals establishing the wireless LAN connection, and
  wherein the change unit changes valid connection information in a case where the number of terminals establishing the wireless LAN connection by the connection unit reaches the upper limit in a case where the information transmission request is received from the terminal.

4. The wireless LAN connection device according to claim 1,
  wherein the change unit changes the valid connection information to connection information that is not stored in the storage unit in a case where connection information corresponding to a terminal transmitting the current information transmission request is not present, based on the history stored in the storage unit.

5. A non-transitory computer readable medium storing a program causing a computer to execute:
  transmitting connection information for a wireless LAN connection to a terminal in response to an information transmission request from the terminal;
  establishing the wireless LAN connection with the terminal in response to a wireless LAN connection request from the terminal using the connection information;
  changing valid connection information for which the wireless LAN connection is recognized;
  storing the connection information used in the past for the wireless LAN connection and a history in which identification information of the terminal is associated with the connection information in a case where the terminal establishes the wireless LAN connection;
  transmitting, to the terminal, the connection information that is changed connection information currently valid and that is different from the connection information that is valid in a previous wireless LAN connection; and
  changing the connection information to valid connection information in a case where connection information corresponding to a terminal transmitting a current information transmission request is present, based on the history.

* * * * *